US009487622B2

(12) United States Patent
Alidedeoglu et al.

(10) Patent No.: US 9,487,622 B2
(45) Date of Patent: *Nov. 8, 2016

(54) PROCESS FOR THE PREPARATION OF MODIFIED POLY(ALKYLENE TEREPHTHALATE) EMPLOYING AN IN-SITU TITANIUM-CONTAINING CATALYST

(71) Applicant: SABIC Global Technologies B.V., Bergen op Zoom (NL)

(72) Inventors: Husnu Alp Alidedeoglu, Evansville, IN (US); Tianhua Ding, Newburgh, IN (US); Ganesh Kannan, Sugar Land, TX (US)

(73) Assignee: SABIC GLOBAL TECHNOLOGIES B.V. (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/787,870

(22) PCT Filed: Jul. 25, 2014

(86) PCT No.: PCT/US2014/048116
§ 371 (c)(1),
(2) Date: Oct. 29, 2015

(87) PCT Pub. No.: WO2015/013572
PCT Pub. Date: Jan. 29, 2015

(65) Prior Publication Data
US 2016/0083511 A1 Mar. 24, 2016

Related U.S. Application Data

(63) Continuation of application No. 13/951,012, filed on Jul. 25, 2013, now abandoned.

(51) Int. Cl.
| | | |
|---|---|---|
| C08G 63/85 | (2006.01) | |
| C08J 11/24 | (2006.01) | |
| C08G 63/183 | (2006.01) | |
| C08G 63/80 | (2006.01) | |
| C08G 63/78 | (2006.01) | |

(52) U.S. Cl.
CPC .......... *C08G 63/85* (2013.01); *C08G 63/183* (2013.01); *C08G 63/78* (2013.01); *C08G 63/80* (2013.01); *C08J 11/24* (2013.01)

(58) Field of Classification Search
CPC .... C08G 63/80; C08G 63/85; C08G 63/183; C08J 11/24
USPC .......................................... 521/40, 48, 48.5
See application file for complete search history.

(56) References Cited

U.S. PATENT DOCUMENTS

| | | | |
|---|---|---|---|
| 4,096,156 A | 6/1978 | Freudenberger et al. | |
| 4,328,059 A | 5/1982 | Horlbeck et al. | |
| 5,266,601 A | 11/1993 | Kyber et al. | |
| 5,451,611 A | 9/1995 | Chilukuri et al. | |
| 6,020,393 A | 2/2000 | Khemani | |
| 6,066,714 A * | 5/2000 | Putzig .............. | B01J 31/0212 502/102 |
| 6,303,738 B1 | 10/2001 | Putzig et al. | |
| 6,472,557 B1 | 10/2002 | Pell, Jr. et al. | |
| 7,129,301 B2 | 10/2006 | Wu et al. | |
| 7,799,836 B2 | 9/2010 | Agarwal et al. | |
| 7,902,263 B2 | 3/2011 | Agarwal | |
| 8,138,233 B2 | 3/2012 | Agarwal et al. | |
| 2003/0149223 A1 | 8/2003 | McCloskey et al. | |
| 2004/0254330 A1 | 12/2004 | Duan et al. | |
| 2005/0113534 A1 | 5/2005 | Agarwal et al. | |
| 2007/0208160 A1 | 9/2007 | Agarwal et al. | |
| 2007/0275242 A1 | 11/2007 | Gopal et al. | |
| 2007/0299150 A1 | 12/2007 | Nakao et al. | |
| 2009/0275698 A1 | 11/2009 | Ravi et al. | |
| 2010/0168336 A1 | 7/2010 | Cohoon-Brister | |
| 2013/0018130 A1 | 1/2013 | Alidedeoglu et al. | |
| 2013/0018131 A1 | 1/2013 | Alidedeoglu et al. | |
| 2013/0018142 A1 | 1/2013 | Alidedeoglu et al. | |
| 2013/0018143 A1 | 1/2013 | Alidedeoglu et al. | |
| 2013/0053461 A1 | 2/2013 | Alidedeoglu et al. | |
| 2014/0031441 A1 | 1/2014 | Alidedeoglu et al. | |

FOREIGN PATENT DOCUMENTS

JP           60147430 A      8/1985

OTHER PUBLICATIONS

Final Office Action dated Apr. 16, 2015; U.S. Appl. No. 13/951,012, filed Jul. 25, 2013 (11 pages).
Non Final Office Action dated Nov. 28, 2014; U.S. Appl. No. 13/951,012, filed Jul. 25, 2013 (16 pages).
International Preliminary Report on Patentability dated Oct. 12, 2015; International Application No. PCT/US2014/048116; International Filing Date Jul. 25, 2014 (5 pages).
International Search Report dated Nov. 18, 2014; International Application No. PCT/US2014/048116; International Filing Date Jul. 25, 2014 (7 pages).
Written Opinion dated Nov. 18, 2014, International Application No. PCT/US2014/048116; International Filing Date Jul. 25, 2014 (9 pages).

* cited by examiner

*Primary Examiner* — Frances Tischler
(74) *Attorney, Agent, or Firm* — Cantor Colburn LLP

(57) ABSTRACT

Disclosed is an improved process for preparing a modified polyalkylene terephthalate by melt polycondensation followed optionally by solid state condensation comprising reacting an alkylene diol and polyethylene terephthalate, wherein polymerization occurs in the presence of a catalyst complex formed by reaction of tetra(alkyl) titanate and a compound selected from phosphorus-containing compounds, nitrogen-containing compounds, boroncontaining compounds, and combinations thereof.

17 Claims, No Drawings

PROCESS FOR THE PREPARATION OF MODIFIED POLY(ALKYLENE TEREPHTHALATE) EMPLOYING AN IN-SITU TITANIUM-CONTAINING CATALYST

TECHNICAL FIELD OF THE INVENTION

Disclosed is a process for preparing a modified polyalkylene terephthalate by melt polycondensation followed optionally by solid state condensation. The process comprises reacting an alkylene diol and polyethylene terephthalate, wherein polymerization occurs in the presence of a catalyst complex formed by reaction of tetra(alkyl) titanate and a compound selected from phosphorus-containing compounds, nitrogen-containing compounds, boron-containing compounds, and combinations thereof.

BACKGROUND OF THE INVENTION

Polybutylene terephthalate (PBT) is a well-known semi crystalline resin that has desirable properties. Compared to amorphous resins such as ABS, polycarbonate, and polystyrene, a crystalline resin like PBT shows much better solvent resistance, higher strength, and higher stiffness due to the presence of crystalline spherulites in the resin. PBT resin is used in many applications, where its solvent resistance, strength, lubricity, and rigidity are needed, such as for durable goods that are formed by injection molding, such as in electronic and communications equipment, computers, televisions, kitchen and household appliances, industrial equipment, lighting systems, gardening and agricultural equipment, pumps, medical devices, food handling systems, handles, power and hand tools, bobbins and spindles, and automotive parts in both under-the-hood and exterior applications. PBT is very widely used to form electrical connectors. Through its many blended products, PBT can be tailored to a wide variety of applications.

Conventional PBT molding compositions generally cannot be made from recycled sources of PBT due to a lack of availability of large post-consumer or post-industrial supplies of PBT scrap materials. Polyethylene terephthalate (PET), unlike PBT, is made in much larger quantities and is more easily recovered from consumer wastes or the like.

With increasing demand for conserving non-renewable resources and for more effectively recycling underutilized scrap PET, improved and less costly processes have been sought for deriving PBT or other polyalkylene terephthalates from scrap PET materials, in particular if the resulting derived polyalkylene terephthalate compositions possess desirable physical properties such as tensile strength, impact strength, and thermal properties.

Polyalkylene terephthalate made from recycled or scrap PET is herein referred to as "modified polyalkylene terephthalate." "Modified polyalkylene terephthalate" includes "modified PBT," wherein the polymer is modified in that it contains at least one residue derived from the polyethylene terephthalate component used in the process. The residue can be either incorporated into the structure of the polymer or present in admixture with the resin composition. Modified polyalkylene terephthalates can identifiably differ slightly from PBT that is not made from scrap PET ("virgin PBT") by such modifications which, however, can be controlled so that the modified PBT has desirable properties comparable or similar to virgin PBT with little or no adverse effects.

Modified polyalkylene terephthalate can generally be made by reacting alkylene diol such as 1,4-butanediol with PET particulates, for example flakes, in the presence of a transesterification catalyst, for instance, as disclosed in U.S. Pat. No. 7,902,263. In general, processes for preparing polyesters by depolymerizing aromatic polyesters in the presence of polyols are known in the art. For example, U.S. Pat. No. 5,451,611 describes a process for converting waste polyethylene terephthalate (PET) to either poly(ethylene-co-butylene terephthalate) or polybutylene terephthalate by reaction with butanediol. Example 11 of U.S. Pat. No. 5,451,611 patent shows a PBT polymer being formed with a complete replacement of ethylene glycol by butanediol. U.S. Pat. No. 5,266,601 and published U.S. Pat Application 20090275698 (A1) describe a process for making PBT from PET by reacting PET with butanediol.

U.S. Pat. Nos. 7,129,301; 6,020,393; 4,328,059, and United States Publication No. 2005/0113534 disclose various catalysts for the polymerization of polyesters. Tetraalkyl titanates have been most commonly used as catalysts for PBT polymerization. The various titanates can include tetraisopropyl titanate, tetrabutyl titanate, and tetra(2-ethylhexyl) titanate. JP 60147430 discloses a method of producing polyester by esterifying terephthalic acid, adipic acid and 1,4-butanediol in the presence of titanium compound and a pentavalent phosphorus compound. U.S. Pat. No. 6,303,738 B1 discloses a process for producing copolyester containing adipic acid in the presence of TYZOR IAM (available from DuPont), which was prepared through the combination of TPT (tetraisopropyl titanate) and a mixture of butyl phosphate and dibutyl phosphate. These catalysts, however, have not been used for the production of modified polyalkylene terephthalates from PET.

At the end of the polymerization process, the catalyst is typically not quenched (deactivated) in the resin composition. Unfortunately, an active catalyst in the resin composition can sometimes lead to undesirable reactions in subsequent processing of the modified polyalkylene terephthalate to make blends or compositions. On exposure to high temperature and humidity, blends and compositions containing the modified polyalkylene terephthalate can exhibit hydrolytic degradation, especially under caustic conditions. Another problem associated with some blends is transesterification, which can lead to loss of mechanical properties.

Catalyst quenchers such as phosphoric acid can be added to thermoplastic compositions to prevent such transesterification, but they can also promote degradation of polymer chains and contribute to a decrease in polymer molecular weight and greater hydrolytic instability. The use of phosphite stabilizers is less satisfactory because of the tendency for phosphites to be unstable to both hydrolysis and oxidation. Although the use of chain extenders can help to counterbalance the effect of the quencher, it is desirable to eliminate the use of either quencher or chain extender additives as a necessity.

Insufficient hydrostability of modified polyalkylene terephthalate can lead to chain cleavage, the extent of which depends on the exact conditions of exposure to water or humidity. Temperature, time of exposure, and pH are all important. Both acids and bases can catalyze ester hydrolysis. Decomposition modified polyalkylene terephthalate can be accelerated in aqueous acid or base, or if the polymer matrix of modified polyalkylene terephthalate contains free acid or base additives. Since a reaction product of polyalkylene terephthalate hydrolysis is itself a carboxylic acid, the hydrolytic decomposition of a polyalkylene terephthalate such as PBT is autocatalytic, as depicted in Scheme 1.

Scheme 1

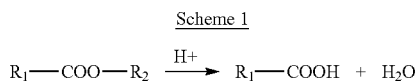

Thus, there remains a need for new and improved catalysts or processes for the production of modified polyalkylene terephthalates that are effective in polymerization, but which do not have adversely impact the properties of the resulting modified polyalkylene terephthalate. There is also a need eliminate the necessity of using either quencher or chain extender additives in preparing modified polyalkylene terephthalates. There is a further need for modified polyalkylene terephthalates with improved properties including hydrostability as well as polymer compositions derived therefrom.

SUMMARY OF THE INVENTION

These and other needs are met by the present invention which is directed to a process for preparing a modified polyalkylene terephthalate by melt polycondensation comprising reacting an alkylene diol and recycled polyethylene terephthalate, wherein polymerization occurs in the presence of a catalyst complex formed by reaction of a tetra(alkyl) titanate and a compound selected from phosphorus-containing compounds, nitrogen-containing compounds, boron-containing compounds, and combinations thereof. The catalyst, which can be synthesized in-situ, is present during depolymerization of the polyethylene terephthalate starting material, ester interchange with an alkylene diol, and subsequent polymerization of the modified PBT.

This process solves the problem described in the prior art regarding undesirable post-polymerization catalytic activity. In particular, the use of an in situ titanium-based catalyst according to the present process can improve hydrolytic stability of the resulting modified poly(alkylene) terephthalate resin and blends thereof by reducing or eliminating transesterification reactions in later processing, especially in blends susceptible to transesterification. Furthermore, use of the catalyst allows the beneficial exclusion of catalyst quenchers in thermoplastic compositions containing the modified polyalkylene terephthalate resin composition. For example, it is not necessary to add a catalyst quencher compounding or compounding of additives prior to extrusion. Such thermoplastic compositions can, therefore, show improved properties under conditions that can otherwise promote transesterification or hydrolytic degradation of the thermoplastic composition.

Thus, in one aspect, the invention is directed to a process for preparing a modified polyalkylene terephthalate from recycled polyethylene terephthalate, the process comprising: forming a catalyst consisting of the reaction product of tetra($C_1$-$C_8$ alkyl) titanate and a complexing agent selected from the group consisting of phosphorus-containing compounds, nitrogen-containing compounds, boron-containing compounds, and combinations thereof, wherein the molar ratio of the complexing agent to the tetra($C_1$-$C_8$ alkyl) titanate is from about 0.2:1 to 0.9:1; depolymerizing recycled polyethylene terephthalate by combining the recycled polyethylene terephthalate, in the presence of the catalyst, with a dihydric alcohol selected from the group consisting of $C_2$-$C_4$ alkylene diols to obtain a molten mixture; transesterifying the depolymerized recycled polyethylene terephthalate in the continued presence of the catalyst and a $C_3$-$C_4$ alkylene diol, which alkylene diol is added during or after depolymerisation to form a molten mixture; polymerizing the molten mixture in the continued presence of the catalyst and $C_3$-$C_4$ alkylene diol, which alkylene diol is added during or after depolymerisation such that the same or different alkylene diol can be present during depolymerization and polymerization, to yield modified polyalkylene terephthalate; and optionally subjecting the modified polyalkylene terephthalate to solid state polymerization to yield a modified polyalkylene terephthalate with a preselected final intrinsic viscosity.

These and other features, aspects, and advantages will become better understood with reference to the following description and appended claims.

DETAILED DESCRIPTION OF THE INVENTION

As used herein the singular forms "a," "an," and "the" include plural referents. The term "combination" is inclusive of blends, mixtures, alloys, reaction products, and the like. Unless defined otherwise, technical and scientific terms used herein have the same meaning as is commonly understood by one of skill Compounds are described using standard nomenclature. The term "and a combination thereof" is inclusive of the named component and/or other components not specifically named that have essentially the same function.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. The endpoints of all ranges reciting the same characteristic or component are independently combinable and inclusive of the recited endpoint. Unless expressly indicated otherwise, the various numerical ranges specified in this application are approximations. The term "from more than 0 to" an amount means that the named component is present in some amount more than 0, and up to and including the higher named amount.

All ASTM tests and data are from the 2003 edition of the Annual Book of ASTM Standards unless otherwise indicated.

With respect to the terms "terephthalic acid group" and "isophthalic acid group" ("diacid groups") or "ethylene glycol group," "butanediol group," and "diethylene glycol group" ("diol groups) being used to indicate, for example, the weight percent of the group in a molecule, the term "isophthalic acid group(s)" means the group or residue of isophthalic acid having the formula (—O(CO)$C_6H_4$(CO)—), the term "terephthalic acid group" means the group or residue of isophthalic acid having the formula (—O(CO)$C_6H_4$(CO)—), the term "diethylene glycol group" means the group or residue of diethylene glycol having the formula (—O($C_2H_4$)O($C_2H_4$)—), the term "butanediol group" means the group or residue of butanediol having the formula (—O($C_4H_8$)—), and the term "ethylene glycol group" means the group or residue of ethylene glycol having the formula (—O($C_2H_4$)—).

The terms "recycle" or "recycled" as used herein refers to any component that has been manufactured and either used or intended for scrap. Thus, a recycle polyester can be polyester that has been used, for example in drinking bottle, or that is a byproduct of a manufacturing process, for example that does not meet a required specification and therefore would otherwise be discarded or scrapped. Recycled materials can therefore contain virgin materials that have not been utilized.

The prefix "bio-" or "bio-derived" as used herein means that the compound or composition is ultimately derived from a biomass or biological source, e.g., "bio-1,3-propane diol" is derived from a biological (e.g., plant or microbial source) rather than a petroleum source. Similarly, the prefix "petroleum-" or "petroleum-derived" means that the compound or composition is ultimately derived from a petroleum source, e.g., a "petroleum-derived polyethylene terephthalate is derived from reactants that are themselves derived from petroleum.

The term "biomass" means living or dead biological matter that can be directly or subsequently converted to useful chemical substances that are ordinarily derived from non-renewable hydrocarbon sources. Biomass can include cellulosic materials, grains, starches derived from grains, fatty acids, plant based oils, as well as derivatives from these biomass examples. Examples of useful chemical substances include and are not limited to diols and monomers used to make diols. Biomass based butane diol can be obtained from several sources. For instance, the following process can be used to obtain biomass-based 1,4-butane diol. Agriculture based biomass, such as corn, can be converted into succinic acid by a fermentation process that also consumes carbon dioxide. Such succinic acid is commercially available from several sources such as from Diversified Natural Products Inc. under the trade name "BioAmber™". This succinic acid can be easily converted into 1,4-butane diol by processes described in several published documents such as in U.S. Pat. No. 4,096,156, incorporated herein in its entirety. Another process that describes converting succinic acid into 1,4-butane diol is described in Life Cycles Engineering Guidelines, by Smith et al., as described in EPA publication EPA/600/R-1/101 (2001).

"Modified polyalkylene terephthalate" means a polyalkylene terephthalate made from recycled or scrap PET, including "modified PBT." The polymer is modified in that it contains at least one residue derived from the polyethylene terephthalate component used in the process.

The term "contain" as it refers to a modified polyalkylene terephthalate containing the catalyst described herein, means that the catalyst, which can be synthesized in-situ, is present during depolymerization of the polyethylene terephthalate starting material, ester interchange with an alkylene diol, and subsequent polymerization of the modified terephthalate, so that the catalyst is present in the isolated modified polyalkylene terephthalate product.

In this application, parts per million (ppm) as relating, for instance to ppm of tetra($C_1$-$C_8$ alkyl) titanate and ppm of a phosphorous containing compound in the modified polyalkylene terephthalate or compositions derived therefrom, is based on the total amount of titanium contained in the modified polyalkylene terephthalate.

Unless otherwise specified, amounts are indicated in percents by weight.

Process

The invention described herein is based on the discovery that it is possible to produce modified polyalkylene terephthalate from polyethylene terephthalate feedstock (including recycled polyethylene terephthalate (PET) or "scrap" polyethylene terephthalate) and a selected group of diols. The recycled PET and diol are combined in the presence of a novel titanium-containing catalyst complex comprising the reaction of tetraalkyl titanate with a complexing agent selected from the group consisting of phosphorus-containing compounds, nitrogen-containing compounds, boron-containing compounds, and combinations thereof.

The process for preparing a modified polyalkylene terephthalate by melt polycondensation followed by optional solid state polymerization, comprises reacting an alkylene diol and polyethylene terephthalate, wherein polymerization occurs in the presence of a catalyst complex formed by reaction of a tetra($C_1$-$C_8$ alkyl) titanate such as tetraisopropyl titanate and a complexing agent selected from phosphorus-containing compounds, nitrogen-containing compounds, boron-containing compounds, and combinations thereof. The catalyst is synthesized in situ, prior to depolymerisation of the polyethylene terephthalate, by adding the components of the catalyst to a solution comprising alkylene diol used in the process. At least 90 mole percent, specifically at least 95 mole percent, more specifically at least 98 mole percent of the diacid groups in the modified polyalkylene terephthalate are terephthalic acid groups.

The titanium catalyst comprises the reaction product of a tetra($C_1$-$C_8$ alkyl) titanate such as tetraisopropyl titanate and a reactant selected from: (1) phosphorus-containing compounds, at a molar ratio of the phosphorus-containing compound:titanate from 0.05:1 to less than or equal to 1.2:1, specifically 0.2:1 to 1.2:1, more specifically 0.3:1 to 1.2:1, most specifically 0.5:1 to 1.2:1, (2) nitrogen-containing compounds, at a molar ratio of the nitrogen-containing compound:titanate from 0.05:1 to less than or equal to 1.2:1, specifically 0.2:1 to 1.2:1, more specifically 0.3:1 to 1.2:1, most specifically 0.5:1 to 1.2:1, (3) boron-containing compounds, at a molar ratio of the boron-containing compound:titanate from 0.05:1 to less than or equal to 1.2:1, specifically 0.2:1 to 1.2:1, more specifically 0.3:1 to 1.2:1, most specifically 0.5:1 to 1.2:1, and (4) combinations thereof.

Phosphorus-containing compounds include phosphoric acid, poly(phosphoric acid), phosphorous acid, monoalkyl phosphates such as monobutyl phosphate, dialkyl phosphates dibutyl phosphate, and combinations thereof.

Nitrogen-containing compounds include alkyl amines, aromatic amines, alkyl aromatic amines, alkanol amines, ammonium compounds, and combinations thereof.

Boron-containing compounds include boric acid, boron alkoxides, boric oxides, boron halides, metaborates, monoalkyl borates, dialkyl borates, trialkyl borates, borazines, and combinations thereof.

In regard to these complexing agents, alkyl groups specifically can be $C_1$ to $C_8$, specifically $C_2$ to $C_6$ alkyl groups, more specifically $C_3$ to $C_5$ alkyl groups.

In one embodiment, the titanium-containing catalyst comprises the reaction product of tetra($C_1$-$C_8$ alkyl) titanate, specifically tetraisopropyl titanate, and a phosphorous-containing compound, specifically phosphoric acid, at a molar ratio of the phosphorous-containing compound:tetra($C_1$-$C_8$ alkyl) titanate, specifically at a molar ratio of phosphorous acid:tetraisopropyl titanate from 0.2:1 to 0.9:1 and more specifically at a molar ratio of 0.6:1 to 0.9:1. Modified polybutylene terephthalate of good quality and properties can be produced with this catalyst, in which the properties are similar to, or essentially the same, virgin polybutylene terephthalate. That is, the modified polybutylene terephthalate can replace virgin polybutylene terephthalate in compositions and blends to produce end products that perform comparably.

In particular, the present process comprises forming a catalyst in situ by combining a tetra($C_1$-$C_8$ alkyl) titanate such as tetraisopropyl titanate with a complexing agent such as phosphoric acid, and an alkylene diol, prior to addition of the polyethylene terephthalate starting material. The catalyst solution can be heated to an elevated first temperature. More particularly, the complexing agent and tetra($C_1$-$C_8$ alkyl) titanate are combined in a reactor and the reactor temperature is raised at atmospheric temperature to a temperature typically in the range of 100 to 150° C. and more specifically in the range of 110 to 130° C., for a time sufficient to remove moisture. Tetra($C_1$-$C_8$ alkyl) titanate is then added, and the reactor temperature is increased at atmospheric temperature to a temperature typically in the range of 150 to 190° C. and more specifically in the range of 160 to 180° C.

The catalyst solution can be combined with recycled polyethylene terephthalate, optionally with further alkylene diol, to obtain a catalyzed reactant mixture. The catalyzed reactant mixture can be subjected to heat to obtain substantially complete depolymerization and then transesterification at an elevated second temperature, typically in the range of 170-240° C., specifically in the range of 180 to 230° C., which is typically higher than the first temperature. Such depolymerization can be carried out at a pressure of at least about atmospheric pressure under an inert atmosphere, such as, for example, under nitrogen.

Specifically, in the preparation of modified polybutylene terephthalate, the recycled polyethylene terephthalate component can be reacted with 1,4-butane diol under inert atmosphere or at reduced pressure and at conditions that are sufficient to depolymerize the polyethylene terephthalate component into a molten mixture containing oligomers containing ethylene terephthalate moieties, oligomers containing ethylene isophthalate moieties, oligomers containing diethylene terephthalate moieties, oligomers containing diethylene isophthalate moieties, oligomers containing butylene terephthalate moieties, oligomers containing butylene isophthalate moieties, covalently bonded oligomeric moieties containing at least two of the foregoing moieties, and/or the like. Polyester moieties and the 1,4-butane diol can be combined in the molten phase under agitation, and the 1,4-butane diol can be continuously refluxed back into the reactor during depolymerization. In one embodiment, 1,4-butane diol is refluxed back into the reactor during depolymerization while excess butanediol, ethylene glycol and tetrahydrofuran are removed during or after depolymerization.

The polyethylene terephthalate component and the 1,4-butane diol component can be combined under atmospheric pressure. In another embodiment, however, it is possible to use pressures that are higher than atmospheric pressures. For instance, in one embodiment, the pressure under which the polyethylene terephthalate component and the 1,4-butane diol are subjected is 2 atmospheres or higher.

The temperature at which the polyethylene terephthalate component and the 1,4-butane diol component are combined and reacted is sufficient to promote depolymerization of the polyethylene terephthalate component into polyethylene terephthalate and polybutylene terephthalate oligomers, 1,4-butane diol, and ethylene glycol. The 1,4-butane diol is generally used in excess amount relative to the polyethylene terephthalate, for example recycled PET scrap. In one embodiment, 1,4-butane diol is used in molar excess relative to recycled PET in an amount ranging from 2 to 20 mole percent. The molar ratio of recycled PET to ethylene glycol is generally in the range of 1:2, more specifically in the range of 1:1.75, and more specifically in the range of 1:1.4 and more specifically in the range of 1:1.5.

The duration of time in which recycled PET reacts with 1,4-butane diol can vary, depending on various factors, such as available equipment, production needs, desired final properties, and the like. In one embodiment, the depolymerization is carried out for at least 30 minutes. In another embodiment, the depolymerization is carried out for about 2 to 5 hours.

Once a molten mixture forms, the molten mixture can be placed in subatmospheric pressure conditions at a suitable temperature for a period of time that is sufficient to polymerize the molten mixture into a PET-derived, modified PBT polymer.

The subatmospheric conditions can include a pressure of less than 3 Torr (4 mbar), specifically less than 2 Torr (2.7 mbar). Advantageously, the molten mixture can be placed under subatmospheric conditions without isolation and dissolution of any material from the molten mixture. The temperature at which the molten mixture is placed under subatmospheric conditions is sufficient to promote polymerization of the polyethylene terephthalate and polybutylene terephthalate oligomers, 1,4-butane diol, and ethylene glycol to the PET-derived modified PBT ("elevated temperature"). Generally, the temperature is at least 220° C. In one embodiment, the temperature ranges from 220° C. to 260° C.

During the time when the molten mixture is placed under subatmospheric conditions and the temperature is increased, excess butanediol, ethylene glycol and THF can be removed from the reactor as the oligomers mentioned above are allowed to build up molecular weight. Agitation can be continuously provided to facilitate the removal of the low boiling components. After sufficient molecular weight is obtained, the molten PBT polymer can be dropped from the reactor, cooled, stranded, and chopped into pellets.

The duration of polymerization discussed above (in which the molten mixture polymerizes from polyethylene terephthalate and polybutylene terephthalate oligomers, 1,4-butane diol, and ethylene glycol) can vary, depending on factors such as equipment available, production needs, desired final properties, and the like. In one embodiment, polymerization is carried out for at least two hours. In another embodiment, the step is carried out for at least 30 minutes, specifically from 2 to 10 hours.

The process for making a PET-derived modified PBT component can include reducing the amount of THF produced during the process by adding to the reactor, during polymerization, a basic compound, containing an alkali metal, or an epoxide. Such methods are disclosed in co-assigned U.S. Pat. Nos. 8,138,233 and 7,799,836, both hereby incorporated by reference in their entirety.

The process for making the PET-derived modified PBT may contain an additional stage in which the modified PBT formed from the molten mixture is subjected to solid-state polymerization. In one embodiment, polymerization of the molten depolymerized mixture is carried out under vacuum by subjecting the depolymerized mixture to vacuum under heat, optionally with distillation, at a pressure of less than 2 Torr and a temperature of 220° C. to 270° C. until a desired intrinsic viscosity is obtained. For example, the desired intrinsic viscosity (IV) can be in the range of 0.4-0.6 dL/g 0.4-0.9 dL/g or 0.7-0.9 dL/g. After the desired intrinsic viscosity is obtained, solid state polymerization is commenced, typically at a temperature of 180° C. to 220° C., until a desired IV is obtained. For example, the desired intrinsic viscosity (IV) can be in the range of 1.0-1.3 dL/g.

Solid-state polymerization generally involves heating the modified PBT formed from the molten mixture under an inert atmosphere to a temperature for a sufficient time to build the molecular weight of the modified PBT. Generally, the temperature to which the PBT is heated is below the melting point of the modified PBT, e.g., from 5° C. to 60°

C. below the melting point of the modified PBT. In one embodiment, such a temperature may range from 180° C. to 220° C. Suitable periods of time during which the solid-state polymerization occurs may range from 2 to 30 hours, depending on the conditions and equipment. The solid-state polymerization is generally carried out under tumultuous conditions sufficient to promote further polymerization of the modified PBT to a suitable molecular weight. Such tumultuous conditions may be created by subjecting the modified PBT to tumbling, the pumping of inert gas into the system to promote fluidization of polymer particle, e.g., pellets, chips, flakes, powder and the like. The solid-state polymerization can be carried out at atmospheric pressure and/or under reduced pressure, e.g. from 1 atmosphere to 1 mbar.

By way of illustration, a titanium-containing catalyst is generated in accordance with the process described herein by in situ reaction of a tetra($C_1$-$C_8$ alkyl) titanate such as tetraisopropyl titanate with a phosphorous-containing compound such as phosphoric acid, as shown in Scheme 2.

group consisting of phosphorus-containing compounds, a nitrogen-containing compounds, a boron-containing compound, and combinations thereof, wherein the molar ratio of the complexing agent to the tetra($C_1$-$C_8$ alkyl) titanate is from 0.2:1 to 0.9:1; depolymerizing the polyethylene terephthalate by combining the polyethylene terephthalate, in the presence of the catalyst, with a dihydric alcohol selected from the group consisting of $C_2$-$C_4$ alkylene diols to obtain a molten mixture; and polymerizing the molten mixture in the continued presence of the catalyst and $C_3$-$C_4$ alkylene diol, which alkylene diol is added during or after depolymerisation such that the same or different alkylene diol can be present during depolymerization and polymerization, thereby yielding a modified polyalkylene terephthalate.

Another embodiment of the invention is directed to a process for preparing a modified polyalkylene terephthalate from recycled polyethylene terephthalate, comprising forming a catalyst consisting of the reaction product of tetra($C_1$-$C_8$ alkyl) titanate and a complexing agent selected from the

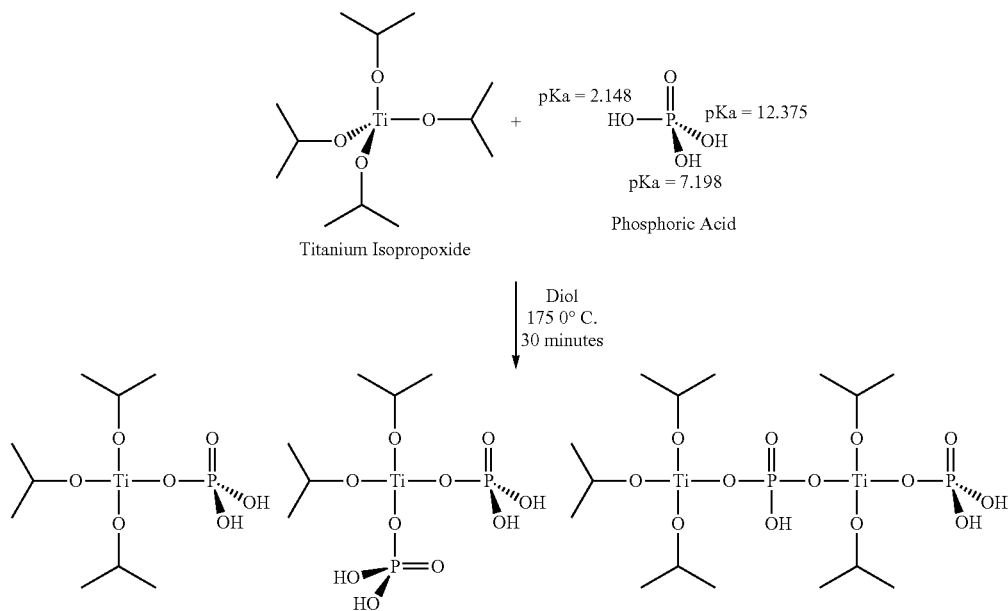

Scheme 2

The in-situ reaction between phosphoric acid and tetraisopropyl titanate in a diol solvent (for example, butanediol) can achieve complete conversion in the reaction between the most acidic hydroxyl group of the phosphoric acid and tetraisopropyl titanate. Without wishing to be bound by theory, it is believed that once all strongly acidic hydroxyl groups are consumed, polymerization can be conducted without inhibition. After catalyst generation, the catalyst components and the polyethylene terephthalate can be introduced into a reactor and the reaction temperature can be increased, for example to 220° C., to complete depolymerization and ester interchange, followed by polymerization, for example at 250° C.

In another embodiment, the invention is directed to a process for preparing a modified polyalkylene terephthalate from recycled polyethylene terephthalate, comprising forming a catalyst consisting of the reaction product of tetra($C_1$-$C_8$ alkyl) titanate and a complexing agent selected from the group consisting of phosphorus-containing compounds, nitrogen-containing compounds, boron-containing compounds, and combinations thereof, wherein the molar ratio of the complexing agent to the tetra($C_1$-$C_8$ alkyl) titanate is from 0.2:1 to 0.9:1, depolymerizing the polyethylene terephthalate by subjecting it to heat in the presence of the catalyst, and then combining it with a first dihydric alcohol selected from the group consisting of $C_2$-$C_4$ alkylene diols, and combinations thereof, to thereby obtain a molten depolymerized mixture; adding a second dihydric alcohol to the molten depolymerized mixture selected from the group consisting of $C_3$-$C_4$ alkylene diols, which second dihydric alcohol is different than the first dihydric alcohol, to thereby obtain a second molten depolymerized mixture; and polymerizing the second molten mixture in the continued presence of the catalyst.

In yet another embodiment, a process for preparing a modified polybutylene terephthalate from recycled polyethylene terephthalate by melt polycondensation comprises: forming a catalyst solution comprising a catalyst that is the reaction product of tetra($C_1$-$C_8$ alkyl) titanate and a phosphorus-containing compound, which catalyst is synthesized in situ, prior to depolymerization of the polyethylene terephthalate, by combining, at an elevated first temperature, the tetra($C_1$-$C_8$ alkyl) titanate and phosphorous-containing compound in butanediol and/or ethylene glycol, wherein the catalyst is formed employing a complexing agent acid: tetraisopropyl titanate molar ratio of 0.2:1 to 0.9:1; forming a catalyzed reactant mixture by combination the catalyst solution with polyethylene terephthalate, optionally with additional butanediol and/or ethylene glycol, and subjecting the catalyzed reactant mixture to heat to obtain substantially complete depolymerization and ester interchange at an elevated second temperature to form a depolymerized mixture; subjecting the depolymerized mixture to heat to melt residual particles of polyethylene terephthalate at an elevated third temperature higher than the second temperature to obtain a molten depolymerized mixture; polymerizing the molten depolymerized mixture under vacuum, in the presence of butanediol added following depolymerization if not before, by subjecting the molten depolymerized mixture to vacuum under heat, optionally with distillation, at a pressure of less than 2 Torr and a temperature of 220° C. to 270° C.; and stopping the polymerization when obtaining a modified polybutylene terephthalate having a number average molecular weight of at least 15,000 g/mol.

In still another embodiment, the invention includes a process for making PTT (polytrimethylene terephthalate) that involves reacting a polyethylene terephthalate component with a 1,3-propanediol at a pressure that is at least atmospheric pressure in the presence of a catalyst component at a temperature ranging from 180° C. to 260° C., under an inert atmosphere, thereby depolymerizing the polyethylene terephthalate component into a molten mixture containing polyethylene terephthalate oligomers, polypropylene terephthalate oligomers, 1,3-propanediol, and ethylene glycol and/or combinations thereof. The polyethylene terephthalate component and the 1,3-propanediol can be combined in the molten phase under agitation and the 1,3 propanediol refluxed back into the reactor, thereby forming a PET-derived PTT.

The polyethylene terephthalate (PET) component of the process means recycled (scrap) PET in flake, powder/chip, film, or pellet form. Before use, the PET is generally processed to remove impurities such as paper, adhesives, polyolefin, e.g., polypropylene, polyvinyl chloride (PVC), nylon, polylactic acid (an aliphatic polyester), and other contaminants.

The process for preparing the modified polyalkylene terephthalate can be a two-stage process in which the alkylene diol incorporated into the modified polyalkylene terephthalate is added for both the depolymerization and polymerization stages. Alternatively, a three-stage process in which a first dihydric alcohol is used for depolymerization and a second dihydric alcohol is used for polymerization and incorporated into the polyalkylene terephthalate. In this embodiment, the first dihydric alcohol and second dihydric alcohol are different, For example, in a three-stage process, the first dihydric alcohol can be any $C_2$-$C_4$ alkylene diol that reacts with the PET to depolymerize the polyethylene terephthalate. Examples of suitable first dihydric alcohols are alkylene diols that can include ethylene glycol, 1,2-propylene glycol, 1,3-propylene glycol, 1,2-butanediol, 2,3-butanediol, 1,4-butanediol, and combinations thereof. In one embodiment, the first dihydric alcohol is selected from 1,4-butanediol, 1,3-propanediol, ethylene glycol, and combinations thereof.

The second dihydric alcohol can be any $C_3$-$C_4$ alkylene diol that reacts with the product of depolymerization in the polymerization of the polyalkylene terephthalate. Examples of a suitable second dihydric alcohol can include 1,2-propylene glycol, 1,3-propylene glycol, 1,2-butanediol, 2,3-butanediol, and 1,4-butanediol, For example, the first alkylene diol can be 1,4-butanediol, 1,3-propanediol, ethylene glycol, or combinations thereof and the second alkylene diol can be diethylene glycol, 1,3-propanediol, 1,4-butanediol, or combinations thereof. In one embodiment of the process, the first dihydric alcohol and the second alkylene diol are different. For example, the first dihydric alcohol can be one or more alkylene diols that do not comprise butanediol and the second dihydric alcohol can be 1,4-butanediol.

In a two-stage process for preparing a modified PBT, a 1,4-butane diol component can react with a polyethylene terephthalate starting material under conditions that depolymerize the polyethylene terephthalate, and a molten mixture of the depolymerized product can be placed under subatmospheric conditions to produce the modified polybutylene terephthalate random copolymer. In a three-stage process for preparing a modified PBT, a diol component selected from the group consisting of ethylene glycol, propylene glycol, and combinations thereof can react with a polyethylene terephthalate component under conditions sufficient to depolymerize the polyethylene terephthalate component into a first molten mixture; and the first molten mixture can be combined with 1,4-butane diol under conditions that creates a second molten mixture that is subsequently placed under subatmospheric conditions to produce a modified polybutylene terephthalate random copolymer.

The final modified polyalkylene terephthalate prepared by the process can be a modified poly(trimethylene terephthalate) derived from petroleum-derived 1,3-propanediol, a modified poly(trimethylene terephthalate) derived from bio-derived 1,3-propanediol, a modified polybutylene terephthalate derived from petroleum-derived 1,4-butanediol, or a modified polybutylene terephthalate derived from bio-derived 1,4-butanediol. The content of aromatic acid groups (in particular isophthalic acid groups and terephthalic acid groups) in the polyalkylene terephthalate can vary depending on the recycled PET used and the reaction conditions. In one embodiment, the aromatic dicarboxylic acid group contains from 0.2 to 3.0 mole percent of isophthalic acid group and from 90 to 99 mole percent of terephthalic acid groups, based on the total moles of diacid groups present in the copolymer. Specifically, at least 90 mole percent, specifically at least 95 mole percent, more specifically at least 98 mole percent or about 0 mole percent, of the diacid groups in the modified polyalkylene terephthalate (specifically modified polybutylene terephthalate) are terephthalic acid, or terephthalic acid groups and isophthalic acid groups, derived from the polyalkylene terephthalate. Specifically, at least 90 mole percent, specifically at least 95 mole percent, more specifically at least 98 mole percent or about 0 mole percent, of the diol groups in the modified polyalkylene terephthalate (specifically modified polybutylene terephthalate) are an alkylene diol group derived from the dihydric alcohol used in polymerizing the modified polyalkylene terephthalate.

The modified polyalkylene terephthalate prepared by the present process contains the components of the titanium-containing catalyst. Thus, the modified polyalkylene terephthalate prepared by the present process contains 50 to 300 ppm of tetra($C_1$-$C_8$ alkyl) titanate and 100 to 600 ppm of a phosphorous containing compound, both based on the total amount of titanium present, wherein the phosphorous containing compound is selected from the group consisting of phosphoric acid, poly(phosphoric acid), phosphorus acid, monobutyl phosphate, dibutyl phosphate, monoalkyl phosphates, dialkyl phosphates, and combinations thereof. More specifically, the modified polyalkylene terephthalate prepared by the present process is modified PBT, which contains 50 to 300 ppm of tetraisopropyl titanate and 100 to 600 ppm of phosphoric acid.

The modified polyalkylene terephthalate prepared by the present process can further comprise other residues present in the recycled PET component, including catalyst residues from the manufacture of the PET, residues from additives in the PET, or residues arising from side reactions that occur during manufacture of the PET and/or the reaction of the first alkylene diol and the PET.

Residues derived from the polyethylene terephthalate component can include ethylene glycol groups, diethylene glycol groups, isophthalic acid groups, antimony-containing compounds, germanium-containing compounds, titanium-containing compounds, cobalt-containing compounds, tin-containing compounds, aluminum, aluminum salts, 1,3-cyclohexanedimethanol isomers, 1,4-cyclohexanedimethanol isomers, alkaline salts, alkaline earth metal salts, phosphorus-containing compounds and anions, sulfur-containing compounds and anions, naphthalene dicarboxylic acids, 1,3-propanediol groups, or combinations thereof. In one embodiment, the residue derived from the polyethylene terephthalate component can comprise one or more of ethylene glycol groups, diethylene glycol groups, and more particularly a combination of ethylene glycol groups and diethylene glycol groups.

The amount of the ethylene glycol groups, diethylene glycol groups, and the isophthalic groups in the polymeric backbone of the modified PBT component can vary. The PET-derived modified PBT component ordinarily contains isophthalic acid groups in an amount that is at least 0.1 mole percent and can range from 0 or 0.1 to 10 mole percent (0 or 0.07 to 7 weight percent). The PET-derived modified PBT component ordinarily contains ethylene glycol in an amount that is at least 0.1 mole percent and can range from 0.1 to 10 mole percent. (0.02 to 2 weight percent). In one embodiment, the PET-derived modified PBT component has an ethylene glycol content that is more than 0.85 weight percent. The modified PBT component can also contain diethylene glycol in an amount ranging from 0.1 to 10 mole percent (0.04 to 4 weight percent). The amount of butane diol groups is generally about 98 mole percent and can vary from 95 to 99.8 mole percent in some embodiments. The amount of the terephthalic acid groups is generally about 98 mole percent and can vary from 90 to 99.9 mole percent in some embodiments. Unless otherwise specified, all molar amounts of the isophthalic acid groups and or terephthalic acid groups in a polyester are based on the total moles of diacids/diesters in the composition. Unless otherwise specified, all molar amounts of the butane diol, ethylene glycol, and diethylene glycol groups are based on the total moles of diol in the composition.

The modified polyalkylene terephthalate prepared by the present process is a random polymer that can have a number average molecular weight of at least 15,000 g/mol and a polydispersity index from 2 to less than 6, specifically 2 to 5. In one embodiment, the modified polyalkylene terephthalate, specifically a modified PBT, has a melting temperature ($T_m$) ranging from 150° C. to 223° C., specifically 200° C. to 218° C., more specifically 204° C. to 210° C.

Advantageously, the present process for making PET-derived modified polyalkylene terephthalate can substantially reduce carbon dioxide emissions and solid waste. Since the modified polyalkylene terephthalate resin compositions made by the inventive process can be made from scrap PET and not monomers, the process can significantly reduce carbon dioxide emissions and solid waste. In contrast, the process to make DMT or TPA from crude oil is highly energy intensive and as a result, substantial emissions of $CO_2$ to the atmosphere can occur from the burning of non-renewable energy sources. By not using DMT or TPA to make the PET derived PBT, substantial carbon dioxide emissions savings can be obtained.

The process for making PET-derived modified PBT can eliminate at least 1 kg of $CO_2$ emissions for every kilogram of PET-derived modified PBT made with the process, as compared to a process that makes virgin PBT homopolymers from monomers. Specifically, the process for making PET-derived modified PBT can eliminate from 1 kg to 1.5 kg, or more $CO_2$ emissions for every kilogram of PET-derived modified PBT made with the inventive process, as compared to a process that makes virgin PBT homopolymers from monomers. Additionally, there are energy savings/reduced carbon dioxide emissions when the ethylene glycol byproduct is recovered and reused.

Additionally, when the source of butanediol is from biomass derived feedstocks such as succinic acid, the carbon dioxide savings can further increase. Furthermore, the fermentation to yield succinic acid requires carbon dioxide as an input, therefore leading to further carbon dioxide reductions.

Accordingly, the present process can produce a modified polybutylene terephthalate random copolymer having a reduced $CO_2$ emissions index, defined as the amount of $CO_2$, expressed in kg, that is saved when one kg of a composition containing the modified polybutylene terephthalate random copolymers is made, as compared to the amount of $CO_2$, expressed in kg, that is created when the composition is made with polybutylene terephthalate that is derived from monomers. Generally, the modified PBT random copolymers made by the present process can have a reduction in $CO_2$ emissions index that is more than approximately 1.3 kg and can range from 1.3 kg to 2.5 kg.

In a specific embodiment, PBT is typically prepared in a pilot plant by reacting polyethylene terephthalate with 1,4-butanediol in the presence of the catalyst described herein. The ratio of the catalyst components (PA:TPT) is typically in the range of 0.2:1 to 0.9:1. The resin is produced via a melt polymerization/solid state polymerization process, wherein melt polymerization involves batch processing (including catalyst preparation), depolymerization, transesterification and polycondensation. Typically a particular IV is targeted for the product obtained from melt polymerization. In one embodiment, the targeted IV is from 0.7-0.9 dL/g. The melt polymerization product is subsequently subjected to solid state polymerization Typically a particular IV is targeted for the product obtained from solid state polymerization. In one embodiment, the targeted IV is from 1.0-1.3 dL/g.

Melt Polymerization. More specifically, melt polymerization is carried out in a pilot plant equipped with a single batch reactor, and involves four steps: in-situ catalyst preparation, depolymerization of recycled PET (rPET), ester interchange (EI), and polymerization. First, ethylene glycol (EG) and phosphoric acid (the amount used depends on the titanium catalyst concentration) are charged into the reactor and the reactor temperature is raised to 120° C. at atmospheric pressure (approximately 1050 mbar). The mixture is held at this temperature and atmospheric pressure for 30 minutes to remove moisture. The calculated amount of titanium isopropoxide to achieve a concentration of 115 ppm of Ti based on the polymer weight is then added into the reactor and the reactor temperature is raised to 170° C. The mixture is held at 170° C. for 70 minutes.

Recycled PET (rPET) is then charged into the reactor (rPET:EG=1:1.5 mol). The reactor temperature was then increased to 225° C. and the pressure was set to 3.5 mbar (2.6 Torr). Depolymerization of rPET to bis-hydroxy ethyl terephthalate (BHET) was completed in 90 minutes by holding the mixture at these conditions. After completion of depolymerization, the reactor is depressurized to 1050 mbar (787 Torr). Next, in the transesterification step, BDO (rPET: BDO=1:3.6 mol ratio) is added to the reactor and the reactor temperature is maintained at 225° C. to complete atmospheric distillation until the column top temperature dropped. A vacuum of 700 mbar (525 Torr) is applied gradually in the transesterification step to remove EG while maintaining the reactor temperature at 225° C. for 30 minutes and the overhead line temperature at 180° C. which allows BDO reflux back into the reactor. EG and BDO are collected as overheads during the transesterification step. The batch is held at these conditions until the column top temperature drops to 130° C. In the polymerization step, the reactor temperature is increased to 240° C. and a vacuum is applied by gradually reducing the pressure to approximately 1 mbar (0.757 Torr), to remove excess BDO, THF, and EG as overheads. After stabilizing the vacuum at approximately 1 mbar and the reactor temperature between 240 and 250° C., the torque in the reactor is monitored until achieving the required intrinsic viscosity (IV) (between 0.7 and 0.8 dL/g). Finally, the polymer melt is drained and then pelletized.

Solid State Polymerization. In order to get a high value of IV (1.17-1.25 dL/g) for the resin prepared from rPET, lower viscosity resins obtained from melt polymerization are subjected to solid state polymerization in a tumbling reactor at 100 mbar (75 Torr) pressure at a temperature of 200° C. for about 18 to 30 h. The IV is checked intermittently during the viscosity build-up and a product with a final IV value of 1.25 is obtained.

Thus, in another aspect the invention is directed to a process for preparing a modified polyalkylene terephthalate from recycled polyethylene terephthalate, the process comprising: forming a catalyst consisting of the reaction product of tetra($C_1$-$C_8$ alkyl) titanate and a complexing agent selected from the group consisting of phosphorus-containing compounds, nitrogen-containing compounds, boron-containing compounds, and combinations thereof, wherein the molar ratio of the complexing agent to the tetra($C_1$-$C_8$ alkyl) titanate is from about 0.2:1 to 0.90:1; depolymerizing recycled polyethylene terephthalate by combining the recycled polyethylene terephthalate, in the presence of the catalyst, with a dihydric alcohol selected from the group consisting of $C_2$-$C_4$ alkylene diols to obtain a molten mixture; transesterifying the depolymerized recycled polyethylene terephthalate in the continued presence of the catalyst and a $C_3$-$C_4$ alkylene diol, which alkylene diol is added during or after depolymerisation to form a molten mixture; and polymerizing the molten mixture in the continued presence of the catalyst and $C_3$-$C_4$ alkylene diol, which alkylene diol is added during or after depolymerisation such that the same or different alkylene diol can be present during depolymerization and polymerization, to yield modified polyalkylene terephthalate; and optionally subjecting the modified polyalkylene terephthalate to solid state polymerization to yield a modified polyalkylene terephthalate with a preselected final intrinsic viscosity.

In one embodiment of this aspect, the catalyst is made prior to depolymerisation of the recycled polyethylene terephthalate.

In another embodiment, the catalyst is made in situ, prior to depolymerization of the recycled polyethylene terephthalate, by combining the tetra($C_1$-$C_8$ alkyl) titanate and complexing agent in the dihydric alcohol used to depolymerize the polyethylene terephthalate.

In another embodiment, the molar ratio of the phosphorus-containing compound:titanate is from 0.2:1 to 0.9:1.

In another embodiment, the $C_2$-$C_4$ alkylene diol and/or the $C_3$-$C_4$ alkylene diol used in the process is synthesized from biomass.

In another embodiment, the $C_2$-$C_4$ alkylene diol is ethylene glycol.

In another embodiment, the $C_3$-$C_4$ alkylene diol is selected from the group consisting of 1,4-butanediol and, 1,3-propanediol and combinations thereof.

In another embodiment, wherein the tetra($C_1$-$C_8$ alkyl) titanate is reacted with a phosphorus-containing compound selected from the group consisting of phosphoric acid, poly(phosphoric acid), phosphorus acid, monobutyl phosphate, dibutyl phosphate, monoalkyl phosphates, dialkyl phosphates, and combinations thereof.

In another embodiment, the tetra($C_1$-$C_8$ alkyl) titanate is tetraisopropyl titanate and the phosphorus-containing compound is phosphoric acid, butyl phosphate, or dibutyl phosphate.

In another embodiment, the tetra($C_1$-$C_8$ alkyl) titanate is tetraisopropyl titanate and the phosphorous-containing compound is phosphoric acid.

In another embodiment, the process comprises preparing the catalyst in situ, in a catalyst solution, by combining the tetra($C_1$-$C_8$ alkyl) titanate, complexing agent, and $C_2$-$C_4$ alkylene diol, prior to addition of the polyethylene terephthalate, wherein the catalyst solution is subject to heat at an elevated first temperature, in the range of 100° C. to 190° C.

In another embodiment, the process comprises forming a catalyzed reactant mixture by combining the polyethylene terephthalate with the catalyst solution, optionally with the addition of a further amount of said dihydric alcohol, and subjecting the catalyzed reactant mixture to a reduced pressure of less than 3 Torr and heat in the range of 200° C. to 260° C. to obtain substantially complete depolymerization.

In another embodiment, the reactant mixture is depressurized to approximately atmospheric pressure after substantial completion of depolymerisation and then $C_3$-$C_4$ alkylene diol is added to the reactant mixture, wherein the pressure is reduced to less than 800 Torr and the temperature is in the range of 200° C. to 260° C. to obtain a molten transesterified mixture.

In another embodiment, the process comprises initiating polymerization of the molten transesterified mixture by subjecting the molten transesterified mixture to heat under vacuum, optionally with distillation, at a pressure of less than 2 Torr and at a temperature of 220° C. to 260° C. to obtain a modified polyalkylene terephthalate with an intrinsic viscosity of about 0.7 to 0.9.

In another embodiment, the process further comprises subjecting the modified polyalkylene terephthalate to solid state polymerization at a reduced pressure of less than 100 Torr and a temperature of 200° C. to 220° C. to obtain a modified polyalkylene terephthalate with a final intrinsic viscosity for the modified polyalkylene terephthalate of 1.0 to 1.3.

In another embodiment, the tetra($C_1$-$C_8$ alkyl) titanate that is reacted with the complexing agent which is a a phosphorous containing compound is provided in a total amount of 50 to 300 ppm of tetra($C_1$-$C_8$ alkyl) titanate and 100 to 600 ppm, both based on the total amount of titanium present.

In another embodiment, the polymerization is stopped after obtaining a modified polyalkylene terephthalate having a number average molecular weight of at least 15,000 g/mol and a polydispersity index (PDI) of from 2 to less than 6.

In another embodiment, the process yields a modified polyalkylene terephthalate having a weight average molecular weight of 10,000 to 70,000, —COOH end groups in the amount of 5 to 40 meq/Kg resin, and —OH end groups in the amount of 10 to 70 meq/Kg resin.

In another embodiment, the recycled polyethylene terephthalate is in particulate solid form.

In another embodiment, the backbone of the modified polyalkylene terephthalate comprises at least one monomer residue exclusively derived from the polyethylene terephthalate.

In another embodiment, the backbone of the modified polyalkylene terephthalate comprises less than 5 mole percent of repeat units derived from ethylene glycol and has a melting point of above 200° C.

In another aspect, the invention is directed to a process for preparing a modified polyalkylene terephthalate from recycled polyethylene terephthalate, which process comprises: forming a catalyzed reactant mixture by subsequently combining the catalyst solution with recycled polyethylene terephthalate, optionally with additional butanediol and/or ethylene glycol, and subjecting the catalyzed reactant mixture to heat to obtain substantially complete depolymerization and ester interchange at an elevated second temperature to form a depolymerized mixture; subjecting the depolymerized mixture to heat to melt residual particles of polyethylene terephthalate at an elevated third temperature higher than the second temperature to obtain a molten depolymerized mixture; transesterifying the molten depolymerized mixture with butanediol; polymerizing the molten depolymerized mixture under vacuum, in the presence of butanediol added following depolymerization if not before, by subjecting the molten depolymerized mixture to vacuum under heat, optionally with distillation, at a pressure of less than 2 Torr and a temperature of 220° C. to 270° C. to form a modified polybutylene terephthalate; and further subjecting the modified polybutylene terephthalate to solid state polymerization to yield a modified polybutylene terephthalate with a preselected final intrinsic viscosity.

In this aspect, the catalyst is synthesized in situ, prior to depolymerization of the polyethylene terephthalate by combining the catalyst with the first dihydric alcohol to obtain a catalyst solution.

In this aspect, the embodiments are as described above and the first dihydric alcohol is ethylene glycol and the second dihydric alcohol is 1,4-butane diol.

In another embodiment, the tetra($C_1$-$C_8$ alkyl) titanate that is reacted with the complexing agent is provided in a total amount of 50 to 300 ppm of tetra($C_1$-$C_8$ alkyl) titanate and 100 to 600 ppm of a phosphorous containing compound, both based on the total amount of titanium present.

In another embodiment, the tetra($C_1$-$C_8$ alkyl) titanate is tetraisopropyl titanate and the phosphorous-containing compound is phosphoric acid.

As stated above, various combinations of the foregoing embodiments can be used.

The invention includes at least the following embodiments.

Embodiment 1: A process for preparing a modified polyalkylene terephthalate from recycled polyethylene terephthalate, the process comprising: forming a catalyst consisting of the reaction product of tetra($C_1$-$C_8$ alkyl) titanate and a complexing agent selected from the group consisting of phosphorus-containing compounds, nitrogen-containing compounds, boron-containing compounds, and combinations thereof, wherein the molar ratio of the complexing agent to the tetra($C_1$-$C_8$ alkyl) titanate is from about 0.2:1 to 0.90:1; depolymerizing recycled polyethylene terephthalate by combining the recycled polyethylene terephthalate, in the presence of the catalyst, with a dihydric alcohol selected from the group consisting of $C_2$-$C_4$ alkylene diols to obtain a molten mixture; transesterifying the depolymerized recycled polyethylene terephthalate in the continued presence of the catalyst and a $C_3$-$C_4$ alkylene diol, which alkylene diol is added during or after depolymerisation to form a molten mixture; and polymerizing the molten mixture in the continued presence of the catalyst and $C_3$-$C_4$ alkylene diol, which alkylene diol is added during or after depolymerisation such that the same or different alkylene diol can be present during depolymerization and polymerization, to yield modified polyalkylene terephthalate; and optionally subjecting the modified polyalkylene terephthalate to solid state polymerization to yield a a modified polyalkylene terephthalate with a preselected final intrinsic viscosity.

Embodiment 2: The process of embodiment 1, wherein the catalyst is made prior to depolymerisation.

Embodiment 3: The process of embodiment 1 or 2, wherein the catalyst is synthesized in situ, prior to depolymerization of the recycled polyethylene terephthalate, by combining the tetra($C_1$-$C_8$ alkyl) titanate and complexing agent in the dihydric alcohol used to depolymerize the polyethylene terephthalate.

Embodiment 4: The process of any of embodiments 1-3, wherein the molar ratio of the phosphorus-containing compound:titanate is from 0.2:1 to 0.9:1.

Embodiment 5: The process of any of embodiments 1-4, wherein the $C_2$-$C_4$ alkylene diol and/or the $C_3$-$C_4$ alkylene diol used in the process is synthesized from biomass.

Embodiment 6: The process of any of embodiments 1-5, wherein the $C_2$-$C_4$ alkylene diol is ethylene glycol.

Embodiment 7: The process of any of embodiments 1-5, wherein the $C_3$-$C_4$ alkylene diol is selected from the group consisting of 1,4-butanediol, 1,3-propanediol, and combinations thereof.

Embodiment 8: The process of any of embodiments 1-7, wherein the tetra($C_1$-$C_8$ alkyl) titanate is reacted with a phosphorus-containing compound selected from the group consisting of phosphoric acid, poly(phosphoric acid), phosphorus acid, monobutyl phosphate, dibutyl phosphate, monoalkyl phosphates, dialkyl phosphates, and combinations thereof.

Embodiment 9: The process of embodiment 8, wherein the tetra($C_1$-$C_8$ alkyl) titanate is tetraisopropyl titanate and the phosphorus-containing compound is phosphoric acid, butyl phosphate, or dibutyl phosphate.

Embodiment 10: The process of embodiment 9, wherein the tetra($C_1$-$C_8$ alkyl) titanate is tetraisopropyl titanate and the phosphorous-containing compound is phosphoric acid.

Embodiment 11: The process of any of embodiments 1-10, comprising preparing the catalyst in situ, in a catalyst solution, by combining the tetra($C_1$-$C_8$ alkyl) titanate, complexing agent, and $C_2$-$C_4$ alkylene diol, prior to addition of the polyethylene terephthalate, wherein the catalyst solution is subject to heat at an elevated first temperature, in the range of 100° C. to 190° C.

Embodiment 12: The process of embodiment 11, comprising forming a catalyzed reactant mixture by combining the polyethylene terephthalate with the catalyst solution, optionally with the addition of a further amount of said dihydric alcohol, and subjecting the catalyzed reactant mixture to a reduced pressure of less than 3 Torr and heat in the range of 200° C. to 260° C. to obtain substantially complete depolymerization.

Embodiment 13: The process of embodiment 12, wherein the reactant mixture is depressurized to approximately atmospheric pressure after substantial completion of depolymerisation and then $C_3$-$C_4$ alkylene diol is added to the reactant mixture, wherein the pressure is reduced to less than 800 Torr and the temperature is in the range of 200° C. to 260° C. to obtain a molten transesterified mixture.

Embodiment 14: The process of embodiment 13, comprising initiating polymerization of the molten transesterified mixture by subjecting the molten transesterified mixture to heat under vacuum, optionally with distillation, at a pressure of less than 2 Torr and at a temperature of 220° C. to 260° C. to obtain a modified polyalkylene terephthalate with an intrinsic viscosity of about 0.7 to 0.9.

Embodiment 15: The process of embodiment 14, further comprising subjecting the modified polyalkylene terephthalate to solid state polymerization at a reduced pressure of less than 100 Torr and a temperature of 200° C. to 220° C. to obtain a modified polyalkylene terephthalate with a final intrinsic viscosity for the modified polyalkylene terephthalate of 1.0 to 1.3.

Embodiment 16: The process of any of embodiments 1-15, wherein the tetra($C_1$-$C_8$ alkyl) titanate that is reacted with the complexing agent which is a a phosphorous containing compound is provided in a total amount of 50 to 300 ppm of tetra($C_1$-$C_8$ alkyl) titanate and 100 to 600 ppm, both based on the total amount of titanium present.

Embodiment 17: The process of any of embodiments 1-16, wherein polymerization is stopped after obtaining a modified polyalkylene terephthalate having a number average molecular weight of at least 15,000 g/mol and a polydispersity index (PDI) of from 2 to less than 6.

Embodiment 18: The process of any of embodiments 1-17, wherein the process yields a modified polyalkylene terephthalate having a weight average molecular weight of 10,000 to 70,000, —COOH end groups in the amount of 5 to 40 meq/Kg resin, and —OH end groups in the amount of 10 to 70 meq/Kg resin.

Embodiment 19: The process of any of embodiments 1-18, wherein the recycled polyethylene terephthalate is in particulate solid form.

Embodiment 20: The process of any of embodiments 1-19, wherein the backbone of the modified polyalkylene terephthalate comprises at least one monomer residue exclusively derived from the polyethylene terephthalate.

Embodiment 21: The process of any of embodiments 1-20, wherein the backbone of the modified polyalkylene terephthalate comprises less than 5 mole percent of repeat units derived from ethylene glycol and has a melting point of above 200° C.

Embodiment 22: A process for preparing a modified polybutylene terephthalate from recycled polyethylene terephthalate, the process comprising: forming a catalyst consisting of the reaction product of tetra($C_1$-$C_8$ alkyl) titanate and a complexing agent selected from the group consisting of phosphorus-containing compounds, nitrogen-containing compounds, boron-containing compounds, and combinations thereof, wherein the molar ratio of the complexing agent to the tetra($C_1$-$C_8$ alkyl) titanate is from about 0.2:1 to 0.90:1; depolymerizing recycled polyethylene terephthalate by combining the recycled polyethylene terephthalate, in the presence of the catalyst, with a dihydric alcohol selected from the group consisting of $C_2$-$C_4$ alkylene diols to obtain a molten mixture; transesterifying the depolymerized recycled polyethylene terephthalate in the continued presence of the catalyst and a $C_3$-$C_4$ alkylene diol, which alkylene diol is added during or after depolymerisation to form a molten mixture; and polymerizing the molten mixture in the continued presence of the catalyst and $C_3$-$C_4$ alkylene diol, which alkylene diol is added during or after depolymerisation such that the same or different alkylene diol can be present during depolymerization and polymerization, to yield modified polyalkylene terephthalate; and subjecting the modified polyalkylene terephthalate to solid state polymerization to yield a a modified polyalkylene terephthalate with a preselected final intrinsic viscosity.

Embodiment 23: The process of embodiment 22, wherein the catalyst is synthesized in situ, prior to depolymerization of the polyethylene terephthalate by combining the catalyst with the $C_2$-$C_4$ alkylene diol to obtain a catalyst solution.

Embodiment 24: The process of embodiment 22 or 23, wherein the $C_2$-$C_4$ alkylene diol is ethylene glycol and the $C_3$-$C_4$ alkylene diol is 1,4-butane diol.

Embodiment 25: The process of any of embodiments 22-24, wherein the tetra($C_1$-$C_8$ alkyl) titanate that is reacted with the complexing agent is provided in a total amount of 50 to 300 ppm of tetra($C_1$-$C_8$ alkyl) titanate and 100 to 600 ppm of a phosphorous containing compound, both based on the total amount of titanium present.

Embodiment 26: The process of embodiment 25, wherein the tetra($C_1$-$C_8$ alkyl) titanate is tetraisopropyl titanate and the phosphorous-containing compound is phosphoric acid.

The invention is further described in the following illustrative examples in which all parts and percentages are by weight unless otherwise indicated.

EXAMPLES

The following examples illustrate the scope of the invention. The examples and preparations which follow are provided to enable those skilled in the art to more clearly understand and to practice the present invention. They should not be considered as limiting the scope of the invention, but merely as being illustrative and representative thereof. The examples are annotated as "E." and comparative examples are annotated hereinafter as "CE", employed the materials listed in Table 1. The invention is further described in the following illustrative examples in which all parts and percentages are by weight unless otherwise indicated.

TABLE 1

| Component | Trade Name and Supplier |
|---|---|
| BDO | 1,4-Butanediol, CAS Reg. No. 110-6304, from BASF. |
| EG | Ethylene Glycol, CAS Reg. No. 107-21-1, available from Futura Polyesters, Ltd. |
| PA | Phosphoric Acid (45 percent in water) CAS Reg. No. 7664-38-2, from Acros. |
| TPT | Tetraisopropyl titanate, CAS Reg. No. 546-68-9, from DuPont, commercial Tyzor grade |
| Recycled PET | Obtained from Futura |

As indicated in Table 1, recycled PET was obtained from Futura Polyesters, Ltd. The recycled polyester was prepared for processing as follows. The post-consumer PET scrap or bottle scrap were collected and hydraulically compressed in the form of bales. The bales were then transported to the cleaning sites. De-baling was achieved using hot water, enabling the bottles to loosen up from the tightly compressed bales to free bottles. Additionally, subjecting the bottles to hot water loosened the sticker from the bottles. Any polyvinyl chloride bottles turned milky white post the hot water wash and were removed. The sorted (clear) bottles were ground to flakes of 3 mm to 5 mm size. The flakes were then subject to hydro-flotation. In hydro-flotation, polypropylene and paper were removed from PET flakes by density separation. The clean PET flakes were alkali washed to remove any glue. The PET flakes were subjected to two cycles of process-water wash and one cycle of washing using demineralized water. The clean flakes were then dried and bagged.

Testing

Color (L*, a*, and b*) values were obtained through the diffuse reflectance method using a Gretag Macbeth ColorEye 7000A with D65 illumination.

The intrinsic viscosity (IV) of the polymer was measured using an automatic Viscotek Microlab® 500 series Relative Viscometer Y501. In a typical procedure, 0.5000 g of polymer sample was fully dissolved in a 60/40 mixture (by vol) of % phenol/1,1,2,2-tetrachloroethane solution (Harrell Industries). Two measurements were taken for each sample, and the result reported was the average of the two measurements.

Carboxylic acid end group concentration was measured through manual titration. The sample resin was dissolved in phenol and dichlorobenzene solvents. Potassium hydroxide in methanol was used as titrant and bromo phenol blue was used as indicator. The analysis was conducted under room temperature and end point color is blue.

Titanium and phosphorous concentrations were obtained from elemental analysis using inductive coupling plasma (ICP) microwave method to confirm the molar ratio of catalyst reactants, TPT and HP.

Part A. Lab Scale Preparation of Modified PBT from Recycled PET

Comparative Example 1 (CE-1)

PBT was prepared on a lab scale from recycled PET and 1,4-butandiol (BDO) using a 1-L 3-necked round bottom flask equipped with a condenser and a vacuum output. A 86.4 g amount of recycled PET and 140 g of BDO were introduced into a three-neck round bottom flask. The reactor was placed in an oil bath temperature of 170° C. Then, 250 ppm of TPT was added to the reaction mixture, and the ester interchange temperature was increased to 220° C. at a rate of 2° C./min while stirring at 260 rpm under nitrogen. After waiting 40 minutes for depolymerization and the ester interchange to occur, the temperature of the reaction mixture was increased further to 250° C. Polymerization was initiated with the vacuum adjusted to below 1 Torr for 1 hour. The polymerization was stopped after achieving the desired intrinsic viscosity.

Example 2 (E-2)

Modified PBT was prepared on a lab scale from recycled PET and 1,4-butandiol (BDO) in the presence of a phosphorous-containing catalyst prepared in situ through the complexation between TPT and phosphoric acid in a 1:0.3 molar ratio. First, 50 g of BDO and 0.15 ml of phosphoric acid solution in water (0.1 g/ml) were introduced into a three neck round bottom flask. The reactor was placed in an oil bath at a temperature of 175° C. After 20 minutes, 250 ppm of TPT was added to the reactor and an in situ complexation between phosphoric acid and TPT was carried out for 40 minutes under $N_2$ atmosphere. Then, 87.4 g of PET and 80 g of additional BDO were introduced into the catalyst solution, and the ester interchange temperature was increased to 220° C. at a rate of 2° C./min while stirring at 260 rpm under nitrogen. After the depolymerization ceased, the temperature of the reaction mixture was further increased to 250° C. to melt the residual PET flakes completely. Polymerization was initiated with vacuum adjusted to below 1 Torr for 40 minutes. The polymerization was stopped after achieving the desired intrinsic viscosity.

Example 3 (E-3)

Modified PBT was prepared on a lab scale from recycled PET and 1,4-butandiol (BDO) using a catalyst was prepared in situ by the reaction between TPT and phosphoric acid in a 1:0.6 molar ratio. First, 50 g of BDO and the phosphoric acid solution (0.1 g/ml in water), to provide the necessary ratio, were introduced into a three neck round bottom flask. The reactor was placed in an oil bath at a temperature of 175° C. After 20 minutes, 250 ppm of TPT was added to the reactor, and an in situ complexation between phosphoric acid and TPT was carried out for 40 minutes under a $N_2$ atmosphere. Then, 87.4 g of PET and 80 g of additional BDO were introduced into the catalyst solution, and the ester interchange temperature was increased to 220° C. at a rate of 2° C./min while stirring at 260 rpm under nitrogen. After the depolymerization is completed and ceases, the temperature of the reaction mixture was further increased to 250° C. to melt the residual PET flakes completely. Polymerization was initiated with the vacuum adjusted to below 1 Torr and carried out for 40 minutes. The polymerization was stopped after achieving the desired intrinsic viscosity.

Example 4 (E-4)

Modified PBT was prepared one lab scale from recycled PET, and 1,4-butandiol (BDO) using catalyst that was prepared in situ by the reaction between TPT and phosphoric acid in 1:1 molar ratio. First, 50 g of BDO, phosphoric acid solution (0.1 g/ml in water), to obtain the indicated molar ratio, were introduced into a three-neck round bottom flask, which was placed in an oil bath at a temperature of 175° C. After 20 minutes, 250 ppm of TPT was added to the reactor and in situ complexation between phosphoric acid and TPT was carried out for 40 minutes under a nitrogen atmosphere. Then, 87.4 g of PET, and 80 g of additional BDO were introduced into the catalyst solution, and the ester interchange temperature was increased to 220° C. at a rate of 2° C./min while stirring at 260 rpm under nitrogen. After the completed depolymerization ceases, the temperature of the reaction mixture was further increased to 250° C. to melt the residual PET flakes completely. Polymerization was initiated with the vacuum adjusted to below 1 Torr and carried out for 40 minutes. The polymerization was stopped after achieving the desired intrinsic viscosity.

Example 5 (E-5)

Modified PBT was prepared on a lab scale from recycled PET and 1,4-butandiol (BDO) using catalyst prepared in situ by the reaction between TPT and phosphoric acid in a 1:1.2 molar ratio. First, 50 g of BDO and phosphoric acid solution (0.1 g/ml in water), to obtain the indicated molar ration, were introduced into a three-neck round bottom flask. The reactor was placed in an oil bath at a temperature of 175° C. After 20 minutes, 250 ppm of TPT was added to the reactor and an in situ complexation between phosphoric acid and TPT was carried out for 40 minutes under nitrogen atmosphere. Then, 87.4 g of PET and 80 g of additional BDO were introduced into the catalyst solution and the ester interchange temperature was increased to 220° C. at a rate of 2° C./min while stirring at 260 rpm under nitrogen. After the completed depolymerization ceased, the temperature of the reaction mixture was further increased to 250° C. to melt the residual PET flakes completely. Polymerization was initiated with the vacuum adjusted to below 1 Torr for 40 minutes. The polymerization was stopped after achieving the desired intrinsic viscosity.

Example 6 (E-6)

Modified PBT was prepared on a lab scale from recycled PET and 1,4-butandiol (BDO) in which the catalyst was prepared in situ by the reaction between TPT and phosphoric acid in a 1:1.5 molar ratio. First, 50 g of BDO and phosphoric acid solution (0.1 g/ml in water) were introduced into a three-neck round bottom flask. The reactor was placed in an oil bath at a temperature of 175° C. After 20 minutes, 250 ppm of TPT was added to the reactor and in situ complexation between phosphoric acid and TPT was carried out for 40 minutes under a nitrogen atmosphere. Then, 87.4 g of PET and 80 g of additional BDO were introduced into the catalyst solution, and the ester interchange temperature was increased to 220° C. with a rate of 2° C./min while stirring at 260 rpm under nitrogen. After the completed depolymerization ceased, the temperature of the reaction mixture was further increased to 250° C. to melt the residual PET flakes completely. Polymerization was initiated with the vacuum adjusted to below 1 Torr for 40 minutes. The polymerization was stopped after achieving the desired intrinsic viscosity.

Example 7 (E-7)

Modified PBT was prepared on a lab scale from recycled PET and 1,4-butandiol (BDO) in which the catalyst was prepared in situ by the reaction between TPT and phosphoric acid in a 1:2 molar ratio. First, 50 g of BDO and phosphoric acid solution in water (0.1 g/ml), to obtain the indicated molar ratio, were introduced into a three neck round bottom flask that was placed in an oil bath at a temperature of 175° C. After 20 minutes, 250 ppm of TPT was added to the reactor, and an in situ complexation between phosphoric acid and TPT was carried for 40 minutes under a nitrogen atmosphere. Then, 87.4 g of PET and 80 g of additional BDO were introduced into the catalyst solution. The ester interchange temperature was increased to 220° C. at a rate of 2° C./min while stirring at 260 rpm under the nitrogen. After the completed depolymerization ceased, the temperature of the reaction mixture was further increased to 250° C. to melt the residual PET flakes completely. Polymerization was initiated with the vacuum adjusted to below 1 Torr and carried out for 40 minutes. The polymerization was stopped after achieving the desired intrinsic viscosity.

Example 8 (E-8)

Modified PBT was prepared on a lab scale from recycled PET and 1,4-butandiol (BDO) using catalyst prepared in situ by the reaction between TPT and phosphoric acid in a 1:3 molar ratio. First, 50 g of BDO and the requisite amount of phosphoric acid solution in water (0.1 g/ml) to obtain the indicated molar ratio were introduced into a three-neck round bottom flask. The reactor was placed in an oil bath at a temperature of 175° C. After 20 minutes, 250 ppm of TPT was added to the reactor. An in situ complexation between phosphoric acid and TPT was carried out for 40 minutes under nitrogen atmosphere. Then, 87.4 g of PET and 80 g of additional BDO were introduced into the catalyst solution. The ester interchange temperature was increased to 220° C. at a rate of 2° C./min while stirring at 260 rpm under nitrogen. After the completed depolymerization ceased, the temperature of the reaction mixture was further increased to 250° C. to melt the residual PET flakes completely. Polymerization was initiated and carried out with the vacuum adjusted to below 1 Torr for 40 minutes. The polymerization was stopped after achieving the desired intrinsic viscosity.

The modified PBT resins prepared in Examples 1-8 were tested and results shown in Table 2. Table 2 summarizes the intrinsic viscosity, melting temperature, and molecular weight of the resin samples made as described in Examples 1-8, prepared by a polycondensation reaction between PET and BDO. Example C-1 represents the control. Examples 2 to 8 were synthesized with an situ catalyst according to the present process. The phosphoric acid to TPT molar ratios given in Table 2 are the calculated molar ratio based on the amounts used for the catalyst preparation. A strong correlation was found between the IV and number average molecular weight results for the resins. The present process enables high molecular weight polyester and IV up to 1.2 molar ratio between phosphoric acid and TPT (Examples 2-5). Above this ratio, the IV and molecular weight of the PBT resin started decreasing gradually. At the molar ratio of 3, the polymerization resulted in oligomers.

TABLE 2

| Ex. | Phosphoric Acid/ TPT | TPT (ppm) | IV (dL/min) | $T_m$ (° C.) | PDI | Mn | Mw |
|---|---|---|---|---|---|---|---|
| CE-1 | 0 | 250 | 0.976 | 216 | 2.8 | 32000 | 89000 |
| E-2 | 0.3 | 250 | 0.905 | 220 | 2.8 | 31000 | 86000 |
| E-3 | 0.6 | 250 | 0.725 | 219 | 2.6 | 24000 | 63000 |
| E-4 | 1 | 250 | 0.791 | 216 | 2.8 | 25000 | 69000 |
| E-5 | 1.2 | 250 | 0.848 | 218 | 3.1 | 27000 | 63000 |
| E-6 | 1.5 | 250 | 0.661 | 209 | 2.6 | 22000 | 57000 |
| E-7 | 2 | 250 | 0.618 | 181 | 2.5 | 22000 | 55000 |
| E-8 | 3 | 250 | 0.202 | 119 | 2.2 | 4900 | 11000 |

As analyzed, the backbone compositions of the PBT prepared in the comparative Example C-1 and Examples 2-8 prepared in the presence of TPT and phosphoric acid are shown in Table 3. The backbone chemical composition of the resin were obtained through proton NMR analysis. Since recycled PET was used as a monomer feedstock, the introduction of comonomer impurities such as isophthalic and ethylene glycol (EG) moieties was inevitable. (The ethylene glycol (EG) content within the PBT backbone can be varied depending on the vacuum condition, i.e., process parameters.) A 1 mol % of isophthalic moieties within in the backbone did not change the crystallinity and melting temperature of the resin drastically. The EG content was found to stay under 2 mol % up to a molar ratio of 1.2. Above this molar ratio, the EG content continued to gradually increase. Using the catalyst that was prepared in a molar ratio greater than 1.2 was found to result in the catalyst losing its transesterification capability for butylene terephthalate and favoring more PET polymerization, which led to a large increase of the polymerization time. The large increase in EG content in the backbone above a molar ratio of 1.2 affects the crystallinity of the resulting resin by lowering the melting temperature.

TABLE 3

| Ex. | Phosphoric Acid:TPT | Catalyst Amount (ppm) | Iso-phthalic (mol %) | Tere-phthalic (mol %) | EG (mol %) | BDO (mol %) |
| --- | --- | --- | --- | --- | --- | --- |
| CE-1 | 0 | 250 | 1.0 | 49.7 | 1.4 | 48.0 |
| E-2 | 0.3 | 250 | 1.0 | 49.6 | 1.1 | 48.3 |
| E-3 | 0.6 | 250 | 1.0 | 49.5 | 1.5 | 48.0 |
| E-4 | 1 | 250 | 1.0 | 49.6 | 1.9 | 47.5 |
| E-5 | 1.2 | 250 | 1.0 | 49.8 | 1.4 | 47.8 |
| E-6 | 1.5 | 250 | 1.0 | 49.9 | 4.9 | 44.1 |
| E-7 | 2 | 250 | 1.0 | 50.3 | 17.6 | 31.1 |
| E-8 | 3 | 250 | 0.9 | 50.2 | 22.1 | 26.9 |

The melting temperatures of Examples 2 to 5 were similar to the melting temperature of the control (Example C-1). After the molar ratio of phosphoric acid:TPT of 1.2:1, however, the melting temperature gradually dropped. The melting temperature gradually decreased above the molar ratio of 1.2 and, below this molar ratio stayed very close to the melting temperature of the control Example C-1.

These examples suggest that the synthesis of modified PBT from the melt polycondensation reaction between PET and BDO can be accomplished in the presence of a new in situ catalyst prepared by the reaction of TYZOR® TPT catalyst with phosphoric acid prior to the depolymerization and ester interchange. Furthermore, the ratio between phosphoric acid and TPT can be controlled to obtain a PBT providing the same standard performance as virgin PBT. In these particular examples, the molar ratio of 1.2, with respect to the novel catalyst, was the maximum ratio for the process to obtain a molecular weight, IV, melting temperature and EG content within a given limit, wherein the molecular weight, IV and melting temperature decreased along with a catalyst-component molar ratio greater than 1.2. The catalyst-component molar ratio was found to affect the introduction of EG moieties in the PBT backbone, wherein above the molar ratio of 1.2, the EG content increased above 2 mol %, resulting in a crystallinity and melting temperature drop, whereas a total impurity level (isophthalic acid and EG) below 3 mole percent provides a modified PBT resin with a standard performance similar to virgin PBT resin.

B. Comparative Example 9 (CE-9)

Scale-Up Process for Preparing Modified PBT

The reference process for preparing PBT is described in U.S. Pat. No. 7,902,263. A modified polybutylene random copolymer was derived from a polyethylene terephthalate component in a helicone reactor. The helicone reactor had a capacity of 40 liters and was equipped with twin opposing helical blades with 270 degree twist. The blade speed varied from 1 to 65 rpm. The agitators were connected to a 7.5 HP Constant Torque Inverter Duty Motor, which operated at 230/460 VAC, 3 PH and 60 Hz. These agitators provided excellent surface area for the polymer melt in order to build molecular weight. The helicone was also equipped with an overhead condenser to condense the vapors in the glycolysis, transesterification (if any) and polymerization stages.

25 lbs (11.4 kg) of recycled PET pellets and 35 lbs (15.9 kg) of BDO (molar ratio 2.9:1) were charged to the helicone reactor. 4.6 ml of TPT catalyst (100 ppm as Ti) were also added to the reaction mix. The temperature of the heating oil for the helicone was set to 250° C. The agitator speed was set at 67% of maximum. The BDO was refluxed into the reactor for 2 hours. It should be noted that the design of the overhead condenser system did not allow a complete reflux of the BDO. As a result, about 5 to 10 lbs (2.3 to 4.5 kg) of BDO that evolved in the initial stages could not be refluxed. The BDO evolved after the initial stages could be completely refluxed into the reactor.

For the polymerization stage (also referred to as the 'poly stage'), a vacuum was applied to the helicone reactor and the reflux of BDO to the reactor was discontinued. The speed of the agitator was set to 60% of max and the target amps of the motor were 3.5 amps. The system pressure was brought down to 0.5 Torr (0.066 kPa) by the vacuum blower. The reaction was carried out until the polymer mass reached its $3^{rd}$ build. The reaction was stopped after 15 minutes into the $3^{rd}$ build and the polymer was cast in blobs. The product was allowed to dry and then was ground into pellets.

C. Examples 10-12

Improved Process for Preparing Modified PBT Using 1,4 Butanediol and Recycled Polyethylene Terephthalate by Melt or Solid State Polycondensation PBT was prepared in a pilot plant by reacting polyethylene terephthalate with 1,4-butanediol with catalyst ratios (TPT:PA) of 1:0, 1:0.25, 1:0.65, 1:0.8, 1:1, 1:1.2, and 1:1.5. All the resins were produced via a melt polymerization/solid state polymerization process. Melt polymerization involved batch processing, including catalyst preparation, depolymerization, transesterification and polycondensation. An IV of 0.75 dL/g was targeted at the end of this process. The process ended with solid state polymerization processing, targeting an IV of 1.2 dL/g.

Melt Polymerization. The melt polymerization process was carried in a pilot plant equipped with a single batch reactor. The process involved four steps: (i) in-situ catalyst preparation; (ii) depolymerization of recycled PET (rPET); (iii) ester interchange (EI); and (iv) polymerization.

First, ethylene glycol (EG) and phosphoric acid (the amount used depended on the titanium catalyst concentration) were charged into the reactor and the reactor temperature was raised to 120° C. at atmospheric pressure (approximately 1050 mbar). The mixture was held at this temperature and atmospheric pressure for 30 minutes to remove moisture. The calculated amount of titanium isopropoxide (115 ppm of Ti based on the polymer weight) was added into the reactor and the reactor temperature was raised to 170° C. The mixture was held at 170° C. for 70 minutes. Recycled PET (rPET) was then charged into the reactor (rPET:EG=1:1.5 mol). The reactor temperature was then increased to 225° C. and the pressure was set to 3.5 mbar (2.6 Torr).

Depolymerization of rPET to bis-hydroxy ethyl terephthalate (BHET) was completed in 90 minutes by holding the mixture at these conditions. After completion of depolymerization, the reactor was depressurized to 1050 mbar (787 Torr). BDO (rPET: BDO=1:3.6 mol ratio) was added to the reactor and the reactor temperature was maintained at 225° C. to complete atmospheric distillation until the column top temperature dropped.

A vacuum of 700 mbar (525 Torr) was applied gradually in the transesterification step to remove EG while maintaining the reactor temperature at 225° C. for 30 minutes and the overhead line temperature at 180° C. which allowed BDO reflux back into the reactor. EG and BDO were collected as overheads during the transesterification step. The batch was held at these conditions until the column top temperature dropped to 130° C.

In the polymerization step, the reactor temperature was increased to 240° C. and a vacuum was applied by gradually reducing the pressure to approximately 1 mbar (0.757 Torr), to remove excess BDO, THF, and EG as overheads. After stabilizing the vacuum at approximately 1 mbar and the reactor temperature between 240 and 250° C., the torque in the reactor was monitored until achieving the required intrinsic viscosity (IV) (between 0.7 and 0.8 dL/g). Finally, the polymer melt was drained and then pelletized.

and had TPT:PA ratios of 1:0.25, 1:0.65, and 1:0.8, respectively. Color (L*, a*, and b*) values were obtained for each example.

After the batch process, each resin met the targeted IV, and all batches had the same color and the same carboxylic acid end group concentration (CEG). The polymerization cycle time was decreased for the batches using the new catalyst, indicating that the phosphoric acid content of the catalyst contributes to the polymerization process by promoting catalysis. However, increased concentration of phosphoric acid in the catalyst did not show a significant effect on the polymerization cycle time.

After solid state polymerization, all resins achieved an IV close to 1.2 dL/g with low carboxylic end group (CEG) values (approximately 10 meq/g). The processing temperature was 200° C. The IV build-up rate decreased as the phosphoric acid content in the in-situ catalyst increased.

TABLE 4

| BATCH PARAMETER | UNITS | CE-9 | E-10 Run 1 | E-10 Run 2 | E-11 Run 1 | E-11 Run 2 | E-12 Run 1 | E-12 Run 2 |
|---|---|---|---|---|---|---|---|---|
| Batch weight | Kg | 10 | 10 | 10 | 10 | 10 | 10 | 10 |
| Molar ratio (PET:BDO) | Ratio | 1:3.6 | 1:3.6 | 1:3.6 | 1:3.6 | 1:3.6 | 1:3.6 | 1:3.6 |
| White Flakes/PCR PET CHIPS | Kg | 8.727 | 8.727 | 8.727 | 8.727 | 8.727 | 8.727 | 8.727 |
| MEG FOR DEPOLYMERIZATION | Kg | 4.227 | 4.227 | 4.227 | 4.227 | 4.227 | 4.227 | 4.227 |
| BDO | Kg | 14.727 | 14.727 | 14.727 | 14.727 | 14.727 | 14.727 | 14.727 |
| TPT - CATALYST (115 ppm) | g | 6.81 | 6.81 | 6.81 | 6.81 | 6.81 | 6.81 | 6.81 |
| PA (45%) | g | N/A | 0.69 | 0.69 | 1.79 | 1.79 | 2.2 | 2.2 |
| Molar ratio (TPT:PA) | — | — | 1:0.25 | 1:0.25 | 1:0.65 | 1:0.65 | 1:0.8 | 1:0.8 |
| IV | dl/g | 0.778 | 0.728 | 0.746 | 0.731 | 0.722 | 0.705 | 0.715 |
| L | CIE | 67.5 | 70.0 | 69.0 | 68.8 | 66.7 | 69.4 | 71.2 |
| a | CIE | −1.80 | −1.70 | −1.50 | −1.60 | −1.20 | −1.50 | −1.60 |
| b | CIE | 2.0 | 2.8 | 2.8 | 3.4 | 4.8 | 3.5 | 2.8 |
| CEG | meq/g | 13.0 | 13.0 | 13.0 | 23.0 | 23.0 | 13.0 | 14.0 |
| Total Esterification time | min | 625 | 645 | 645 | 650 | 630 | 640 | 640 |
| Esterification end temp | C. | 225 | 225 | 225 | 225 | 225 | 225 | 225 |
| Polymerization cycle time | min | 200 | 175 | 175 | 172 | 170 | 165 | 170 |
| Polymerization final temp | ° C. | 250 | 250 | 250 | 250 | 250 | 250 | 250 |

| SSP PARAMETER | UNITS | CE-9 | E-10 | E-11 | E-12 |
|---|---|---|---|---|---|
| SSP PARAMETERS (Batch size) | kg | 7 | 16 | 15 | 16 |
| IV | d/g | 1.192 | 1.212 | 1.227 | 1.223 |
| L* | CIE Lab | 72 | 72 | 71.45 | 71.8 |
| a* | CIE Lab | −1.3 | −1.4 | −1.1 | −1.0 |
| b* | CIE Lab | 4.2 | 4.3 | 4.8 | 4.5 |
| CEG | meq/g | 12 | 11 | 18 | 8 |
| Processing temperature | ° C. | 195 | 200 | 200 | 200 |
| Delta IV Increase | dl/g | 0.414 | 0.475 | 0.500 | 0.513 |
| Residence time at reaction temperature | Hrs | 18 | 20 | 27 | 26 |
| IV build up rate | units/hr | 0.0230 | 0.02375 | 0.0185 | 0.0195 |

Solid State Polymerization. In order to get a high value of IV (1.17-1.25 dL/g) for the resin prepared from rPET, low viscosity resins obtained from the batch process were subjected to solid state polymerization in a tumbling reactor at 100 mbar (75 Torr) pressure at a temperature of 200° C. for about 18 to 30 h. The IV was checked intermittently during the viscosity build-up until a product with a final IV value of 1.25 was obtained.

Results

Table 4 summarizes the process parameters and results for Comparative Example 9 (CE-9), Example 10 (E-10), Example 11 (E-11), and Example 12 (E-12) resins. CE-9 resin was prepared through conventional titanium based catalyst using the process disclosed in U.S. Pat. No. 7,902,263 as described in Part B. E-10, E-11, and E-12 were prepared according to the new process as provided in Part C Table 5 shows the process parameters and results for E-13, E-14, and E-15 resins, which were also prepared via the new process, and had TPT:PA ratios of 1:1, 1:1.2, and 1:1.5, respectively. All three resins reached IV values that were lower than the target. The polymerization cycle time increased along with the increase of the phosphoric acid content of the examples. The L* values of the resulting resins decreased compared to resins summarized in Table 3. A reason for the lower L* values may be the decrease of crystallinity due to the insertion of PET block within the backbone. Since the melting temperature of the resulting resins was lower, the solid state polymerization was unsuccessful. The IV build-up to the targeted IV was extremely slow for the final resins.

Both Tables 4 and 5 show that the ratio between TPT and phosphoric acid in the preparation of the catalyst directly affects depolymerization and polycondensation. For TPT:PA ratios above 1:0.8, the depolymerization step was not completed and a large extent of PET insertion was observed, resulting in lower melting temperature and L* value, indicating less crystalline product.

TABLE 5

Process Parameters and Results of iQPBT315 Resins Prepared in Pilot Plant

| PARAMETER | UNITS | CE-9 | E-13 Run 1 | E-13 Run 2 | E-14 Run 1 | E-15 Run 1 |
|---|---|---|---|---|---|---|
| Batch weight | Kg | 10 | 10 | 10 | 10 | 10 |
| Molar ratio (PET:BDO) | Ratio | 1:3.6 | 1:3.6 | 1:3.6 | 1:3.6 | 1:3.6 |
| White Flakes/PCR PET CHIPS | Kg | 8.727 | 8.727 | 8.727 | 8.727 | 8.727 |
| MEG FOR DEPOLY | Kg | 4.227 | 4.227 | 4.227 | 4.227 | 4.227 |
| BDO | Kg | 14.727 | 14.727 | 14.727 | 14.727 | 14.727 |
| TPT - CATALYST (115 ppm) | g | 6.81 | 6.81 | 6.81 | 6.81 | 6.81 |
| Phosphoric Acid (85% p) | g | N/A | 2.8 | 2.8 | 3.3 | 4.1 |
| Molar ratio (TPT:PA) | — | — | 1:1.0 | 1:1.0 | 1:1.2 | 1:1.5 |
| IV | dl/g | 0.778 | 0.688 | 0.687 | 0.667 | 0.670 |
| L | CIE | 67.5 | 54.5 | 56.5 | 52.1 | 52.0 |
| a | CIE | −1.80 | 0.50 | −0.40 | 0.70 | 0.90 |
| b | CIE | 2.0 | 5.8 | 6.0 | 3.3 | 4.7 |
| COOH | meq/g | 13.0 | 25.0 | 24.0 | 27.0 | 26.0 |
| Total Esterification time | min | 625 | 675 | 680 | 690 | 775 |
| Esterification end temp | C. | 225 | 225 | 225 | 226 | 225 |
| Poly cycle time | min | 200 | 280 | 295 | 310 | 330 |
| Poly final temp | ° C. | 250 | 250 | 250 | 250 | 250 |

| PARAMETER | UNITS | CE-9 | E-13 | E-14 | E-15 |
|---|---|---|---|---|---|
| SSP PARAMETERS (Batch size) | kg | 7 | No Build | No Build | No Build |
| IV | d/g | 1.192 | | | |
| L* | CIE Lab | 72 | | | |
| a* | CIE Lab | −1.3 | | | |
| b* | CIE Lab | 4.2 | | | |
| Processing temperature | ° C. | 12 | | | |
| Delta IV Increase | dl/g | 195 | | | |
| Residence time at reaction temperature | Hrs | 0.414 | | | |
| IV build up rate | units/hr | 18 | | | |

The foregoing disclosure has been described in some detail by way of illustration and example for purposes of clarity and understanding. The invention has been described with reference to various specific and preferred embodiments and techniques. However, it should be understood that many variations and modifications can be made while remaining within the spirit and scope of the invention. It will be obvious to one of skill in the art that changes and modifications can be practiced within the scope of the appended claims. Therefore, it is to be understood that the above description is intended to be illustrative and not restrictive. The scope of the invention should, therefore, be determined not with reference to the above description, but should instead be determined with reference to the following appended claims, along with the full scope of equivalents to which such claims are entitled.

The invention claimed is:

1. A process for preparing a modified polyalkylene terephthalate from recycled polyethylene terephthalate, the process comprising:
    forming a catalyst consisting of the reaction product of tetra($C_1$-$C_8$ alkyl) titanate and phosphoric acid, wherein the molar ratio of the phosphoric acid to the tetra($C_1$-$C_8$ alkyl) titanate is from about 0.2:1 to 0.90:1;
    depolymerizing recycled polyethylene terephthalate by combining the recycled polyethylene terephthalate, in the presence of the catalyst, with a dihydric alcohol selected from the group consisting of $C_2$-$C_4$ alkylene diols to obtain a molten mixture;
    transesterifying the depolymerized recycled polyethylene terephthalate in the continued presence of the catalyst and a $C_3$-$C_4$ alkylene diol, which alkylene diol is added during or after depolymerisation to form a molten mixture; and
    polymerizing the molten mixture in the continued presence of the catalyst and $C_3$-$C_4$ alkylene diol, which alkylene diol is added during or after depolymerisation such that the same or different alkylene diol can be present during depolymerization and polymerization, to yield modified polyalkylene terephthalate; and
    optionally subjecting the modified polyalkylene terephthalate to solid state polymerization to yield a modified polyalkylene terephthalate with a preselected final intrinsic viscosity;
    wherein at least 90 mole percent of diacid groups in the modified polyalkylene terephthalate are terephthalic acid groups derived from the recycled polyethylene terephthalate.

2. The process of claim 1, wherein the catalyst is made prior to depolymerisation.

3. The process of claim 1, wherein the catalyst is synthesized in situ, prior to depolymerization of the recycled polyethylene terephthalate, by combining the tetra($C_1$-$C_8$ alkyl) titanate and phosphoric acid in the dihydric alcohol used to depolymerize the polyethylene terephthalate.

4. The process of claim 1, wherein the molar ratio of phosphoric acid:titanate is from 0.2:1 to 0.9:1.

5. The process of claim 1, wherein the $C_2$-$C_4$ alkylene diol and/or the $C_3$-$C_4$ alkylene diol used in the process is synthesized from biomass.

6. The process of claim 1, wherein the $C_2$-$C_4$ alkylene diol is ethylene glycol.

7. The process of claim 1, wherein the $C_3$-$C_4$ alkylene diol is selected from the group consisting of 1,4-butanediol, 1,3-propanediol, and combinations thereof.

8. The process of claim 1, comprising preparing the catalyst in situ, in a catalyst solution, by combining the tetra($C_1$-$C_8$ alkyl) titanate, phosphoric acid, and $C_2$-$C_4$ alkylene diol, prior to addition of the polyethylene terephthalate, wherein the catalyst solution is subject to heat at an elevated first temperature, in the range of 100° C. to 190° C.

9. The process of claim 8, comprising forming a catalyzed reactant mixture by combining the polyethylene terephthalate with the catalyst solution, optionally with the addition of a further amount of said dihydric alcohol, and subjecting the catalyzed reactant mixture to a reduced pressure of less than 3 Torr (400 pascals) and heat in the range of 200° C. to 260° C. to obtain substantially complete depolymerization.

10. The process of claim 9, wherein the reactant mixture is pressurized to approximately atmospheric pressure after substantial completion of depolymerisation and then $C_3$-$C_4$ alkylene diol is added to the reactant mixture, wherein the pressure is less than 800 Torr (0.1 megapascal) and the temperature is in the range of 200° C. to 260° C. to obtain a molten transesterified mixture.

11. The process of claim 10, comprising initiating polymerization of the molten transesterified mixture by subjecting the molten transesterified mixture to heat under vacuum, optionally with distillation, at a pressure of less than 2 Torr (267 pascals) and at a temperature of 220° C. to 260° C. to obtain a modified polyalkylene terephthalate with an intrinsic viscosity of about 0.7 to 0.9.

12. The process of claim 11, further comprising subjecting the modified polyalkylene terephthalate to solid state polymerization at a reduced pressure of less than 100 Torr (13,000 pascals) and a temperature of 200° C. to 220° C. to obtain a modified polyalkylene terephthalate with a final intrinsic viscosity for the modified polyalkylene terephthalate of 1.0 to 1.3.

13. The process of claim 1, wherein the tetra($C_1$-$C_8$ alkyl) titanate that is reacted with phosphoric acid is provided in a total amount of 50 to 300 ppm of tetra($C_1$-$C_8$ alkyl) titanate and 100 to 600 ppm of phosphoric acid.

14. The process of claim 1, wherein polymerization is stopped after obtaining a modified polyalkylene terephthalate having a number average molecular weight of at least 15,000 g/mol and a polydispersity index (PDI) of from 2 to less than 6.

15. The process of claim 1, wherein the process yields a modified polyalkylene terephthalate having a weight average molecular weight of 10,000 to 70,000, —COOH end groups in the amount of 5 to 40 meq/Kg resin, and —OH end groups in the amount of 10 to 70 meq/Kg resin.

16. The process of claim 1, wherein the backbone of the modified polyalkylene terephthalate comprises at least one monomer residue exclusively derived from the polyethylene terephthalate.

17. The process of claim 1, wherein the backbone of the modified polyalkylene terephthalate comprises less than 5 mole percent of repeat units derived from ethylene glycol and has a melting point of above 200° C.

* * * * *